United States Patent [19]
Kurby et al.

[11] Patent Number: 5,559,806
[45] Date of Patent: Sep. 24, 1996

[54] TRANSCEIVER HAVING STEERABLE ANTENNA AND ASSOCIATED METHOD

[75] Inventors: Christopher N. Kurby, Elmhurst; John W. Arens, Grayslake; James P. Phillips, Lake in the Hills, all of Ill.

[73] Assignee: Motorola, Inc., Schaumburg, Ill.

[21] Appl. No.: 394,982

[22] Filed: Feb. 27, 1995

[51] Int. Cl.⁶ .................................................. H04B 7/195
[52] U.S. Cl. ..................... 370/95.3; 455/13.3; 455/25; 455/33.2
[58] Field of Search .................... 455/12.1, 13.1, 455/13.3, 25, 33.2, 33.3, 82, 277.1, 277.2; 342/352, 353, 354, 358, 368, 371, 372; 370/95.3, 97

[56] References Cited

U.S. PATENT DOCUMENTS

| | | | |
|---|---|---|---|
| 3,340,531 | 9/1967 | Kefalas et al. | 342/368 |
| 4,977,616 | 12/1990 | Linder et al. | 455/277 |
| 5,095,535 | 3/1992 | Freeburg | 455/277.1 |
| 5,157,407 | 10/1992 | Omiya | 342/357 |
| 5,194,873 | 3/1993 | Sickles, II | 342/374 |
| 5,239,541 | 8/1993 | Murai | 370/77 |
| 5,303,240 | 4/1994 | Borras et al. | 370/95.3 |
| 5,408,237 | 4/1995 | Patterson et al. | 455/13.3 |
| 5,432,780 | 7/1995 | Smith et al. | 370/95.1 |

Primary Examiner—Benedict V. Safourek
Attorney, Agent, or Firm—Daniel W. Juffernbruch

[57] ABSTRACT

An earth station transceiver (210) is provided for communicating with at least one satellite (110, 120) in orbit. The earth station transceiver (210) has an antenna with an array of antenna elements (220, 230) and steering circuitry (240) for steering an antenna pattern created by the array of antenna elements. A position of a beam (310–330) from a satellite can be represented by a beam number. The antenna pattern can be determined without taking signal quality measurements when the beam is at an extreme elevation angle as represented by the beam number. Signal quality measurements can alternatively be made during a time slot or frame to choose an antenna pattern instead of choosing an antenna pattern based on satellite beam number when the beam is not at an extreme elevation angle. Signal quality measurements using the same antenna pattern are made to perform an intra-site handoff. Signal quality measurements using all antenna patterns are made to perform an intersite handoff.

15 Claims, 5 Drawing Sheets

5,559,806

TRANSCEIVER HAVING STEERABLE ANTENNA AND ASSOCIATED METHOD

BACKGROUND OF THE INVENTION

1. Technical Field of the Invention

The present invention relates to a transceiver having a steerable antenna and, more particularly, relates to a transceiver and a method of operation thereof having circuitry for controlling a steerable antenna.

2. Description of the Related Art

Ordinary portable transceivers, such as portable telephones and pagers are equipped with an antenna having a constant gain pattern. Because the antenna has a constant gain pattern, the energy at various horizontal and vertical locations transmitted from or received by the antenna is fixed and not variable. To provide different antenna patterns, transceiver antennas have been proposed with an array of two or more antenna elements. By using the two or more antenna elements, the antenna pattern can be steered. U.S. Pat. No. 5,303,240 issued to Borras et al. uses a steerable antenna to selectively direct energy transmitted from a transceiver into a particular direction. Directing transmit energy from a transceiver in a particular direction reduces interference by reducing the system gain in other directions and enhances the desired signal strength.

Satellite communications systems under development, such as the Iridium® satellite system, propose using L-Band communications in a combination of frequency division multiple access and time division multiple access (FDMA/TDMA) multiplexing to make the most efficient use of limited spectrum. This TDMA structure has frames with a framing time slot and with a plurality of transmit and receive time slots of short duration. These frames are preferably built on a 90 millisecond frame with four transmit and four receive time slots, each of a short 8.28 millisecond duration, and a framing time slot of 23.76 milliseconds. In time division multiple access satellite communication systems, the number of time slots made available per cell can be limited by the system. In such a system, for example, each cell has only one time slot for use.

Power measurements taken for different antenna patterns during the single time slot can disrupt voice or data traffic. Borras et al. make power measurements during non-traffic time slots. In a satellite system using only one time slot per cell, non-traffic time slots are not available for making measurements. An efficient technique for measuring signal quality and steering an antenna is needed for communicating on a single time slot in a cell with a satellite. A technique for making alternate antenna pattern decisions without disrupting traffic in time slots is also needed.

Satellite communications systems, such as the Iridium® satellite system, propose a constellation of 66 non-geosynchronous orbiting satellites. Each satellite will have a plurality of 48 individual beams or cells projected onto the earth's surface. As these satellites orbit around the earth, both the satellites and satellite beams will move. A stationary point on the earth's surface will cross boundaries between beams once approximately every 50 seconds. A new satellite will serve the stationary point on earth once approximately every 9 minutes. In radiotelephone systems, handoff decisions are typically made by measuring power from different cells. When different antenna patterns must be evaluated and chosen at the same time as beams and satellites evaluated and chosen, non optimum antenna pattern and poor handoff decisions could be made. An efficient technique for adapting the antenna during the voice or data traffic in the current beam and handing off a transceiver between different beams of the same satellite and different beams of different satellites is also needed.

BRIEF DESCRIPTION OF THE DRAWINGS

The present invention solves these and other problems by providing the below described and other features of the invention which will become more apparent from the following detailed description when read in conjunction with the accompanying drawings.

DETAILED DESCRIPTION OF THE PREFERRED EMBODIMENTS

The present invention reliably uses a steerable antenna array on an earth station transceiver for communication with a satellite. Signal quality measurements and comparative decisions need to be made during a single short time slot allotted to the cell or beam only when a beam of the satellite is inside an elevation angle range. Certain beams can be identified by their beam number as having a predictable elevation angle. Some beams are always projected either straight downward from a satellite and have a high elevation angle. Other beams are always projected outward from a satellite and have a low elevation angle. These high and low elevation angles are outside a range of middle elevation angles and thus can be defined as extreme elevation angles. Besides minimizing transmitter power and thus extending battery life, the received signal-to-noise ratio (SNR) is improved allowing use of smaller antennas on portable earth station transceivers.

In low earth orbit (LEO) mobile satellite systems (MSS), a portable radiotelephone or pager would typically be provided with an antenna having an omnidirectional hemispherical pattern. These antennas would have directive gain patterns in elevation. The gain pattern of this example antenna would be constant versus azimuth angle. Simple theoretical antennas such as this example can be modeled using two isotropic point sources which are fixed in distance from each other but are driven with different phases. If the phases are changed, the antenna pattern also changes in elevation angle.

Figure 1:
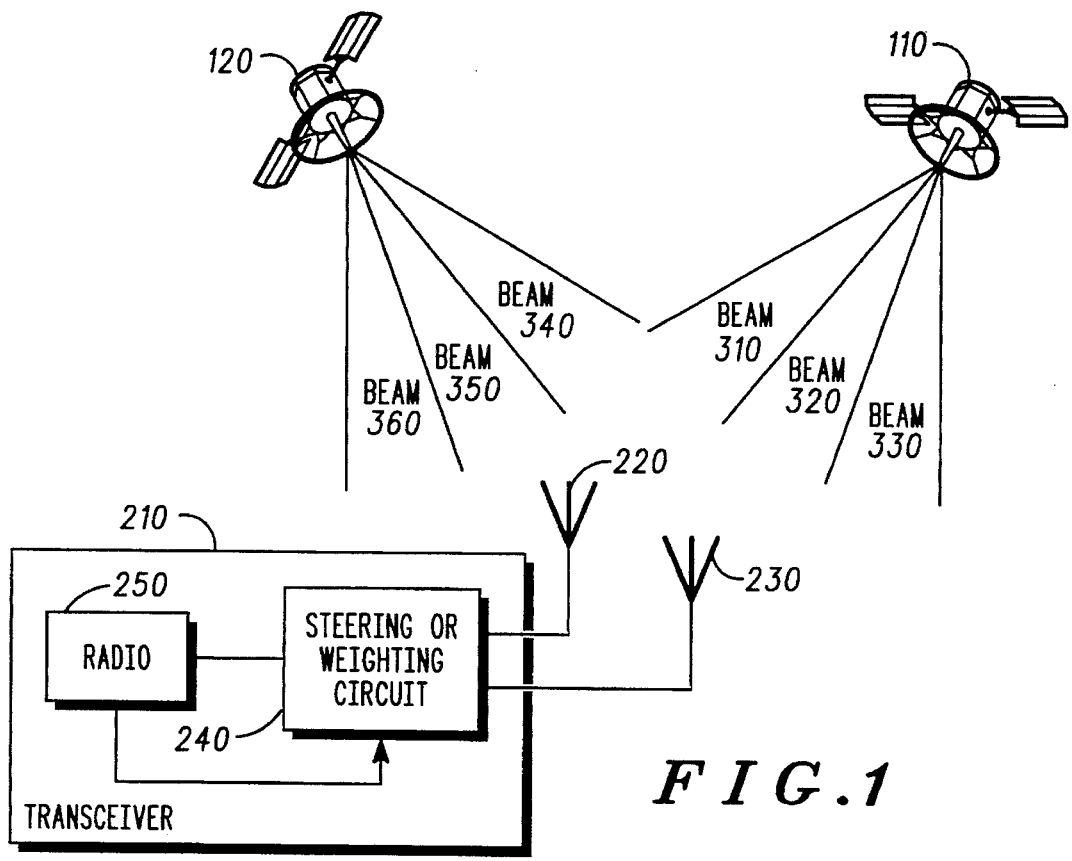
FIG. 1 illustrates a satellite in communication with a transceiver having an array of antenna elements according to the present invention.

FIG. 1 illustrates a low earth orbit mobile satellite system having numerous space vehicles (SV) or satellites 110 and 120 that orbit the earth. A subscriber transceiver 210 has a plurality of antenna elements 220 and 230 for communication with one of the beams 310, 320, 330, 340, 350 and 360 or cells of a satellite. When the satellites 110 and 120 constantly move, the elevation angle of each beam or cell changes with respect to a subscriber transceiver 210 on earth. In the present invention, the transceiver 210 has a steering circuit 240 for steering the antenna under control of the radio 250. Based on measurements taken in a single time slot of a beam or cell, an antenna pattern can be steered as the satellites 110 and 120 move.

As a satellite moves, an earth station transceiver 210 must conduct an intra-site handoff between two beams (e.g., 310 and 320) of a single satellite (e.g., 110). As a satellite moves further, the earth station transceiver must perform and inter-site handoff between two satellites (e.g., 110 and 120). The present invention controls measurement of signal quality from two beams of one satellite and two beams of different satellites by the different antenna elements of the array to accurately and efficiently make transceiver assisted handoff decisions. If multiple beams are measured for the same satellite using different antenna patterns, erroneous handoff decisions will be made because, at the edge between two beams of the same satellite, the elevation angle to the satellite of each beam is the same. Conversely, if the same antenna pattern is used to measure different beams from different satellites, the best handoff decisions will sometimes not be made because two different satellites can be at two different elevation angles.

Thus, during intra-site handoff between two beams of the same satellite, the present invention fixes the antenna pattern during measurements and before and after actual handoff. During inter-site handoff between two beams of different satellites, however, the present invention compares signal quality from different beams of different satellites with both the same antenna pattern and a different antenna pattern. If a beam on a candidate satellite has a better gain, an inter-site handoff occurs and the beam and antenna pattern of the candidate site is chosen. Further details of the handoff measurement and decisions are explained below with reference to the flow chart in FIG. 7.

The earth station transceiver 210 of FIG. 1 preferably uses antenna elements having different phasings to provide different gain patterns in elevation. The two antenna elements correspond to the antennas 220 and 230 of FIG. 1. To provide the minimum audio and data traffic degradation when determining the optimum antenna pattern on the same time slot as traffic data on a beam, it is desirable to measure signal quality for alternate antenna patterns in as short a time as possible. To minimize degradation of traffic and reduce the bit error rate or voice quality, the sampling of the alternate antenna pattern is set at the end of a time slot. Also using the beam number when possible will reduce the antenna adaptation process and minimize voice and data traffic degradation.

If the alternate antenna pattern has improved gain, the radio 250 will control the steering or weight circuit 240 to select or maintain the alternate antenna pattern for the next time slot. Sampling the alternate antenna pattern for a very short time at the end of the time slot has further advantages in addition to providing minimum audio or data traffic degradation. By sampling at the end of the time slot, the least sensitive voice coder (vocoder) bits typically are placed, or can be placed, at the end of the time slot. Thus, only the least sensitive vocoder bits at the end of the time slot would be corrupted if the tested alternate antenna pattern had substantially lower gain.

Figure 2:
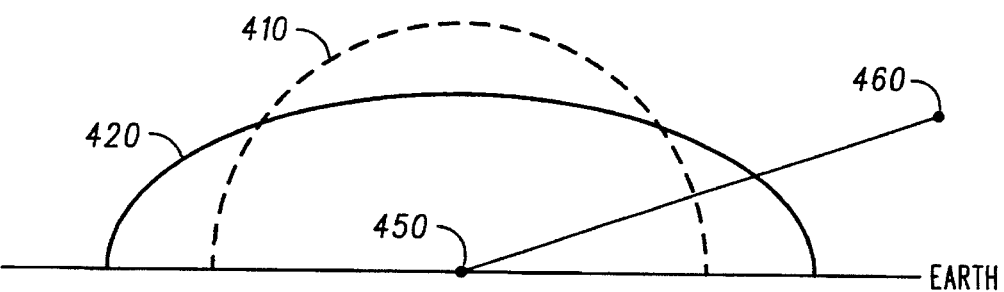
FIG. 2 illustrates an elevational view of two antenna patterns corresponding to two antenna elements of a transceiver when the satellite is at a low elevation angle according to the present invention.
Figure 3:
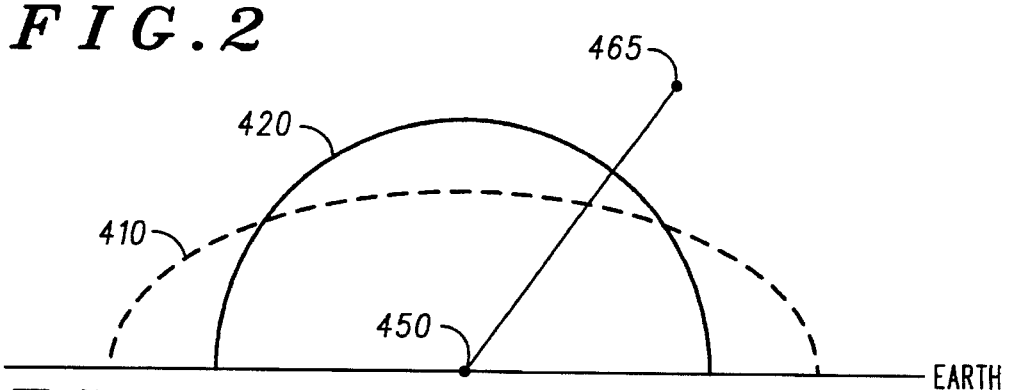
FIG. 3 illustrates an elevational view of two antenna patterns corresponding to two antenna elements of a transceiver when the satellite is at a high elevation angle according to the present invention.

FIGS. 2 and 3 illustrate elevational views of a first pattern 410 (a first phase) and a second pattern 420 (second phase) of two antenna elements of a transceiver 450. FIG. 2 illustrates the satellite 460 at a first position and FIG. 3 illustrates the satellite 465 at a second position. In the two antenna pattern embodiment of FIGS. 2 and 3, only a two state antenna pattern is used. A phase circuit in the steering or weight circuit 240 for adjusting the antenna pattern created by two antenna elements becomes more difficult to build if multiple intermediate antenna patterns are desired. The phase shifter circuit will be illustrated connected to the antenna below in the discussion of FIG. 5. Continuous adjustment of the antenna pattern between extremes would be possible if a continuous phase shifter was available. Nevertheless, because handoff decisions require knowledge of an antenna pattern position and gain, a larger number of possible antenna patterns increases the complexity of a reliable handoff decision.

Figure 4:
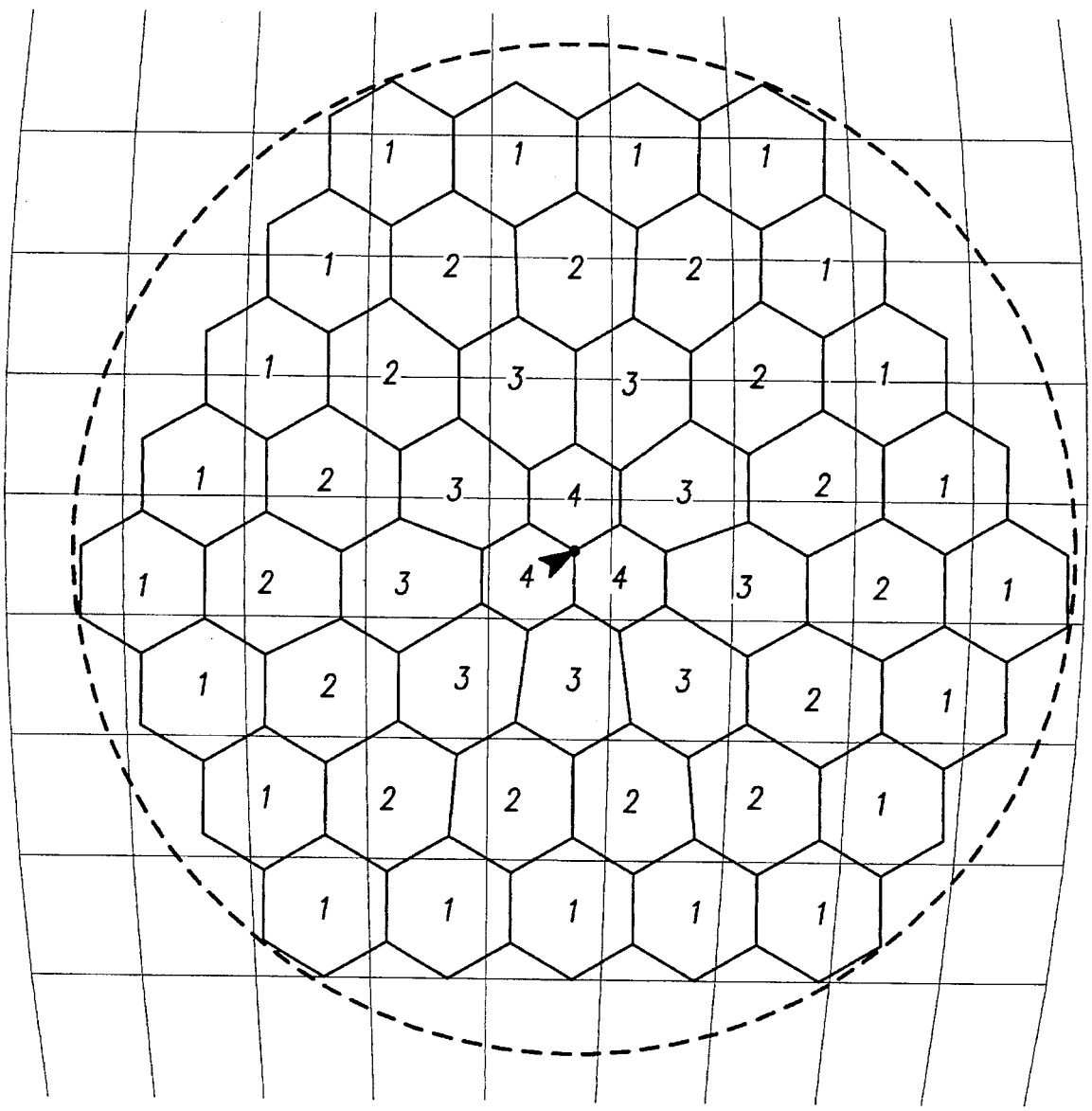
FIG. 4 illustrates plan view of a plurality of numbered beams or cells on the earth's surface corresponding to one satellite according to the present invention.

FIG. 4 illustrates a plan view of the earth's surface. The location of all 48 proposed beams in the Iridium® satellite system for one satellite are illustrated. Each of the 48 illustrated beams has a unique beam number assigned to it by the satellite. The beam number value is digitally encoded for each beam in the downlink frames from the satellite.

According to the present invention, the transceiver of the present invention groups the beams into rings or categories. Four of these rings 1, 2, 3 and 4 are illustrated in FIG. 4. Instead of periodically measuring the signal quality for each transceiver antenna pattern, an antenna pattern can be selected without engaging in constant signal quality measurements for alternate antenna patterns by considering a ring assigned by the transceiver to a received beam number. Measuring signal quality for different antenna elements disrupts voice or data traffic, particularly during the single time slot. Beams having extreme elevation angles lie near the center of FIG. 4 and near the edges of the satellite's beam projection on the earth's surface as illustrated in FIG. 4. If the earth station transceiver is programmed to obtain the serving beam number, the transceiver antenna pattern can be deterministically selected based on the beam number according to the following TABLE. This TABLE depicts the range of elevation angles for an ideal model of the beams on the surface of the earth. Actual beam patterns will vary due to the physical nature of a satellite's antennas. Minimum and maximum elevation angles (elev. min. and elev. max.) for each of the beams can be calculated as a function of the constellation geometry, including the number of satellites, their spacing, and their height, in a geometric manner known to those of skill. The number of rings chosen can depend on the beam's maximum and minimum elevation angles. The elevation angles for the beams in the example of FIG. 4 preferably fall into these four rings. A different number of rings may be preferred and will change dependent on the number of beams and their configuration.

TABLE

| Ring Category | Elev. Min. | Elev. Max. | Pattern 1 | Pattern 2 |
| --- | --- | --- | --- | --- |
| 1 | 52.21° | 90.00° | yes | no |
| 2 | 30.89° | 65.16° | yes | yes |
| 3 | 16.86° | 45.10° | yes | yes |
| 4 | 6.72° | 31.84° | no | yes |

Thus the beams lying in rings 1 and 4 have an extreme elevation angle, and the antenna pattern yielding the best signal quality can be determined based on the beam number. For the beams lying in rings 2 and 3, transceiver antenna pattern selection based on cell number and category will not lead to a best or definitive antenna pattern choice. In such an instance, either pattern can be chosen after signal quality measurements have been taken.

Figure 5:
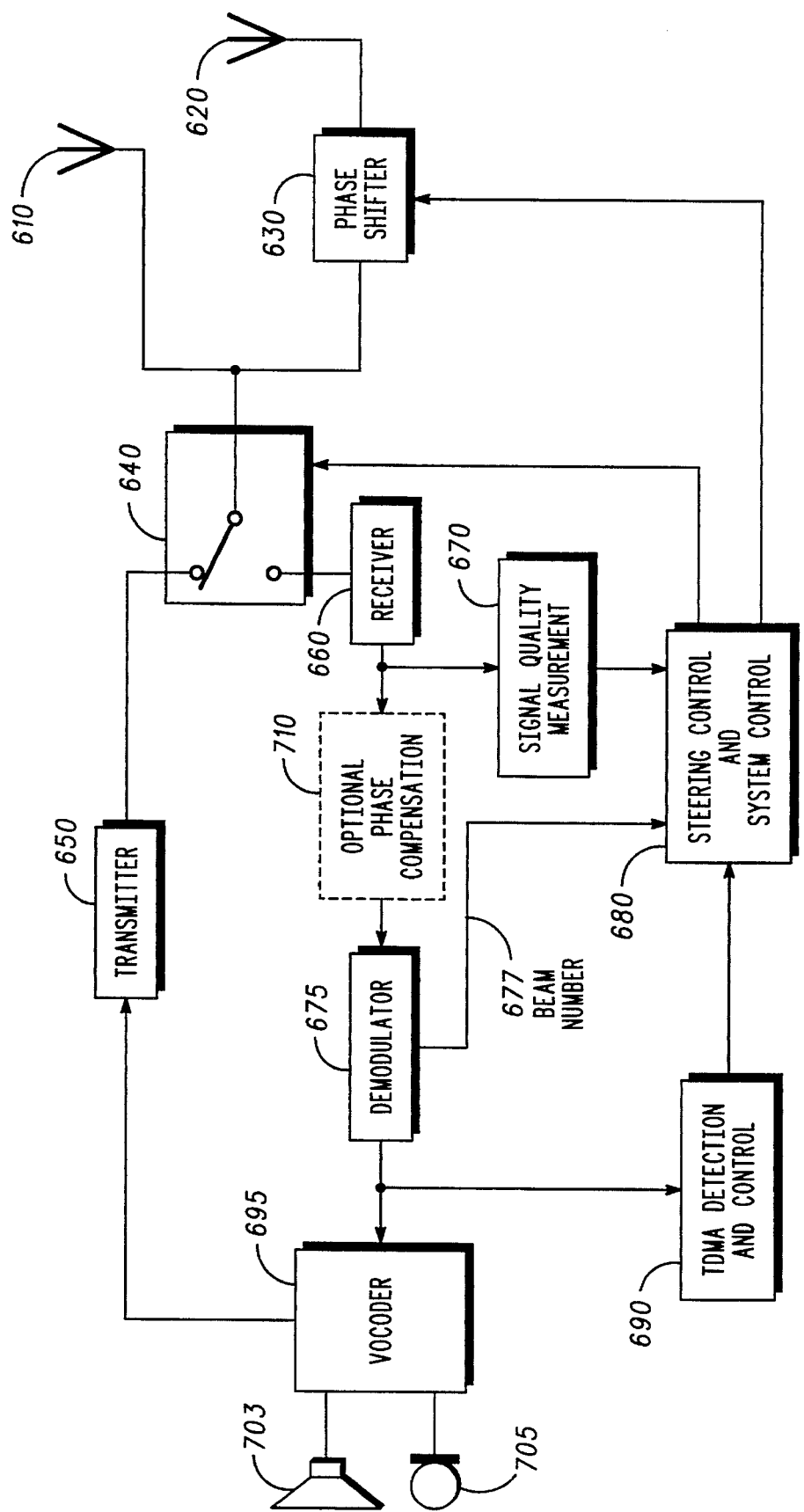
FIG. 5 illustrates a schematic block diagram of transceiver circuitry for controlling and steering antenna elements according to the present invention.

FIG. 5 illustrates a schematic block diagram of a transceiver having an array of antenna elements according to the present invention. Two antenna elements 610 and 620 are provided for the transceiver's antenna. The elements have two different phasings that provide significantly different gain patterns in the elevational direction. The array of antenna elements can have more than the two illustrated antenna elements 610 and 620. This can be accomplished by adding a phase shifter for each of the additional antenna elements. A first of the antenna elements 610 connects directly, while a second of the antenna element 620 connects through a phase shifter 630. The phase shifter 630 shifts the phases of the signal to and from the second antenna element 620. Dependent on the phase shifted by the phase shifter 630, the first and second antenna element 610 and 620 are selectively phase weighted and added together. The first and second antenna elements 610 and 620 could additionally or alternatively be amplitude weighted and added together. Weighting of the antenna elements could be eliminated altogether by switching on and off alternate antenna elements. Nevertheless, antenna elements with different patterns that operate with the same transceiver would be more difficult to build than a steerable phased antenna array according to the preferred embodiment of the present invention.

An antenna switch 640 connects the antenna elements 610 and 620 to either a transmitter 650 or a receiver 660. The transmitter 650 and receiver 660 preferably provide a quadrature phase shift keyed (QPSK) modulation. A signal quality measurement is made by a signal quality measurement circuit 670 and forwarded to steering control and system control block 680. The signal quality measured by the signal quality measurement circuit 670 is represented by signal power or signal-to-noise (S/N) ratio. The steering control and system control block 680 provides a control signal to the antenna switch 640 and a steering control signal to the phase shifter 630. The steering control signal to the phase shifter 630 controls steering based on signal quality measurements as discussed above. The steering control and system control block 680 also obtains timing information from a TDMA detection and control block 690. An output of the receiver 660 is fed to a demodulator 675. The demodulator demodulates the received signal and extracts certain information such as the beam number 677 for steering control use by the steering control and system control block 680. The demodulator also provides a demodulated received signal to a vocoder 695. The vocoder also feeds the transmitter 650 and couples to a microphone 705 and a speaker 703 for user interface to the transceiver. When adapting the antenna during a voice or data traffic time slot, the output of the receiver can be phase compensated using one of two different compensation options as follows.

If the antenna is switched to the alternate pattern a phase discontinuity will occur which will impair coherent phase detection by a coherent detector of the transceiver. According to a first compensation option, compensation can be provided by using a selectively enabled non-coherent detector in block 675 at the time of a phase discontinuity. When the antenna pattern is switched, causing a phase discontinuity in a coherent detector, the non-coherent detector would be enabled. Eventually the coherent detector will catch up on the phase change caused by the discontinuity. Thus, the non-coherent detector can be used over only a portion of the evaluation time until the coherent detection can be switched back in again. A slight sensitivity loss is experienced but this loss is considered tolerable compared to the risk of loosing a remaining portion of the time slot.

According to a second compensation option, instead of feeding the output of the receiver 660 to the vocoder 695 directly, an optional phase compensation block 710 between the output of the receiver 660 and the demodulator 675 can compensate for abrupt phase shift. Preferably this phase compensation should be performed using a phase prediction technique.

Figure 6:
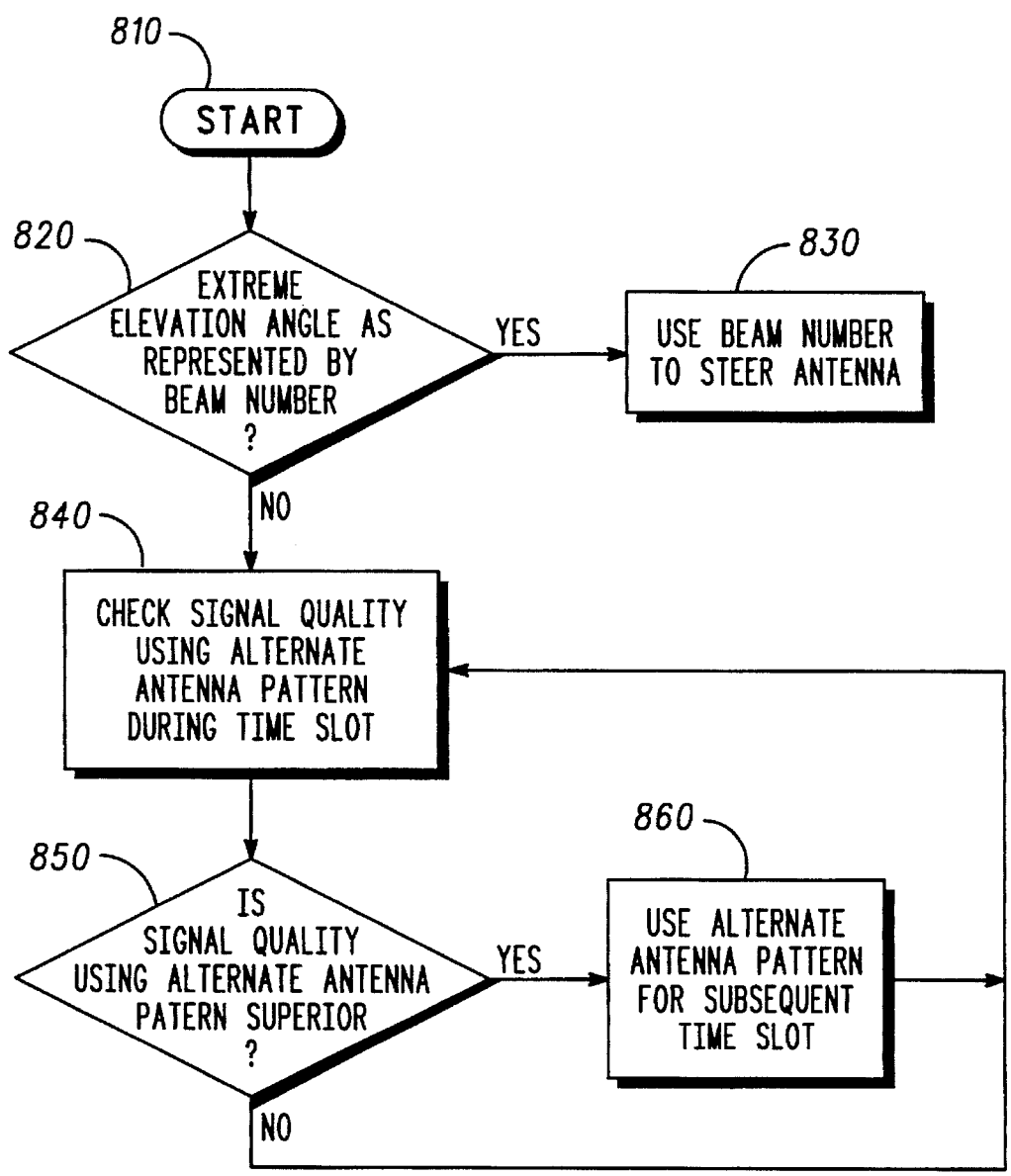
FIG. 6 illustrates a flow chart describing steering between alternate patterns according to the present invention.

FIG. 6 illustrates a flow chart for a transceiver engaged in voice of data channel traffic for steering between antenna elements during a voice channel tracking mode according to the present invention. After step 810, step 820 determines if the present beam has an extreme elevation angle as indicated by the beam number. If the present beam has an extreme elevation angle, the beam number can be used to steer the antenna by step 830. In step 830, the antenna is steered according to the above-described TABLE based on the ring assigned to the beam number. If the beam does not have an extreme elevation angle, flow proceeds to step 840 from step 820.

At step 840, the signal quality of the beam received by the alternate antenna pattern is checked. The signal quality of the beam is preferably checked during the time slot. Preferably, the time slot is checked at the end of the time slot as discussed above. Step 850 determines if the alternate antenna pattern is superior in signal quality to the other antenna and, if yes, the alternate antenna pattern is used for the next or subsequent frame in step 860. In either event, flow repeats back to step 840.

Figure 7:
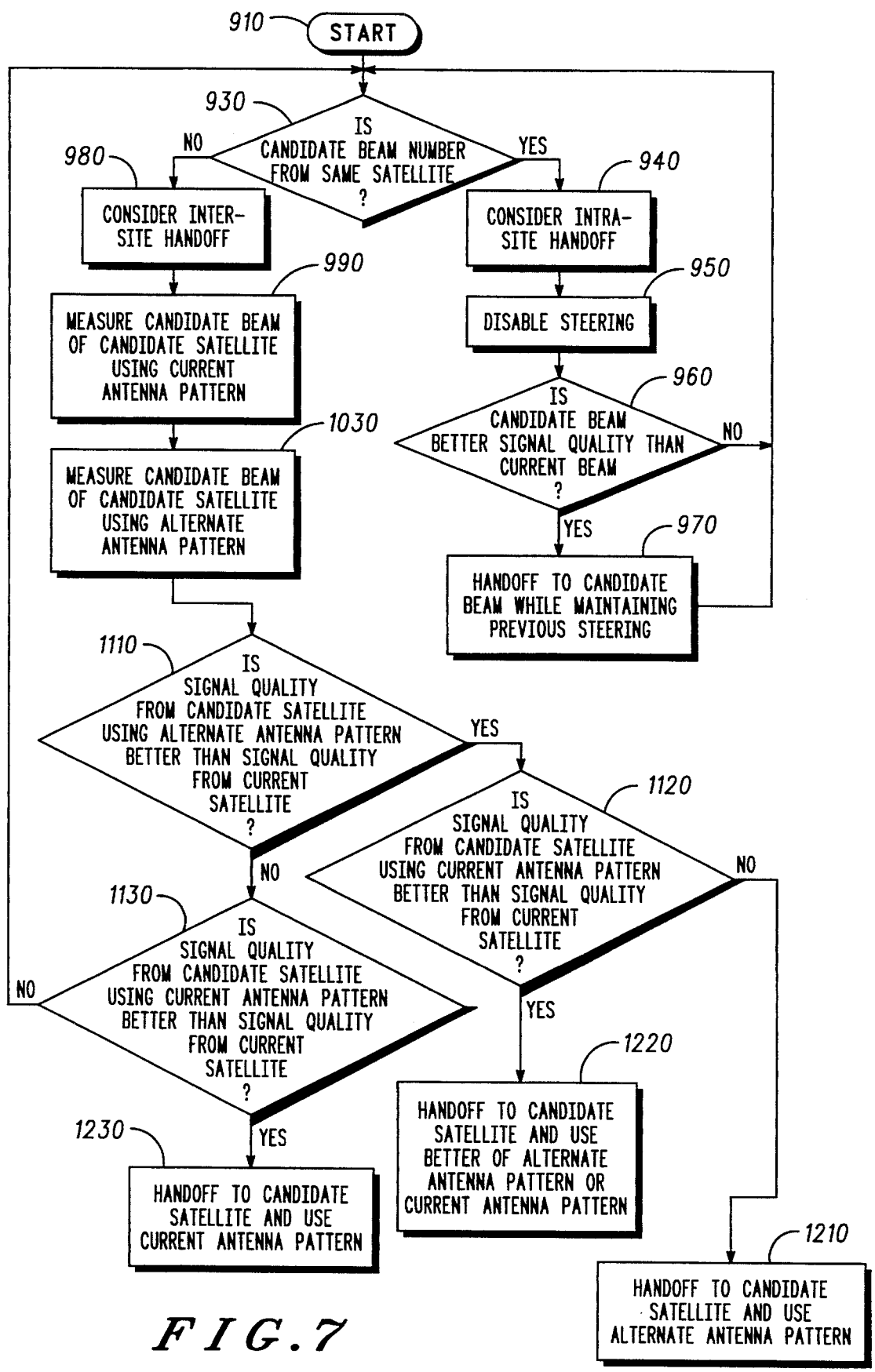
FIG. 7 illustrates a flow chart describing handoffs according to the present invention.

FIG. 7 illustrates a flow chart for conducting transceiver assisted handoffs of both intra-site and inter-site handoff types during a handoff evaluation mode. The handoff routine begins at step 910. For a low earth orbit (LEO) satellite system such as the Iridium® satellite system, the individual satellites will pass overhead a transceiver approximately once every 9 minutes. Assuming the transceiver is not moving very rapidly relative to the satellites, inter-site handoffs between satellites will occur approximately only once every 9 minutes. Because each satellite has approximately 48 beams, intra-site handoffs between beams will occur approximately every 50 seconds.

Step 930 determines if the candidate beam is from the same satellite by considering its beam number. If the candidate beam is from the same satellite, then an intra-site handoff between beams of the same satellite needs to be considered beginning at step 940. On the other hand, if step 930 determines the candidate beam is not from the same satellite, an inter-site handoff between beams of different satellites needs to be considered beginning at step 980.

When an intra-site handoff between beams of the same satellite is considered at step 480, steering is disabled at step 490. Steering is disabled during an intra-site handoff because a transceiver at the adjacent boundary between two beams has the same elevation angle to the same satellite. If different antenna patterns were used to measure signal quality of adjacent beams of the same satellite, erroneous measurements would be taken because, at the boundary between two beams of the same satellite, the elevation angle to the satellite of each beam is the same. If the candidate beam has a higher signal quality than the current beam as determined in step 960, a handoff to the candidate beam occurs in step 970. Either way, flow returns back to step 930 for consideration of other handoffs. When both an inter-site handoff and a intra-site handoff are needed in step 930, the choice of step 940 or step 980 is not important and the intra-site or intra-site handoff determinations can be performed in either order.

After step 980, step 990 measures a candidate beam of a candidate satellite using the current antenna pattern. Additionally, the candidate beam of the candidate satellite is measured using an alternate antenna at step 1030. If the signal quality from the candidate satellite using the alternate antenna pattern is better than the signal quality from the current satellite using the current antenna pattern at step 1110, a handoff will eventually occur, but step 1120 is then performed to determine the best antenna pattern. Step 1120 determines if the signal quality from the candidate satellite using the current antenna pattern is better than the signal quality from the current satellite using the current antenna pattern. If no, the alternate antenna pattern was best, and a handoff occurs and the alternate antenna pattern is used in step 1210. If yes, the better of the signal quality of the alternate antenna pattern or the current antenna pattern is used and a handoff occurs in step 1220.

Step 1130 determines if the signal quality from the candidate satellite using the current antenna pattern is better than the signal quality from the current satellite using the current antenna pattern. If yes, the signal quality from the candidate satellite for the current antenna pattern is better than the signal quality from the current satellite, a handoff occurs in step 1230 and the current antenna pattern is used. Otherwise, flow proceeds back to the beginning at step 930. Each pair of steps 1110 and 1120 and steps 1110 and 1130 can be performed in either order.

A decision step 1110, 1120 or 1130 can alternatively be performed between the measurement steps 990 and 1030. This alternative allows a handoff decision to be implemented immediately before additional measurements are made. When the handoff is implemented immediately, the transceiver reverts to the traffic channel tracking mode of FIG. 6 and the alternate antenna patterns will be checked. The time necessary to make additional measurements could exceed the amount of time that a pattern has a best signal quality due to movement of the serving beam and the satellite. Additionally, because a decision has already been made that a handoff will occur, it is preferred not to delay handoff in order to decide on a preferred antenna pattern. By performing a handoff as soon as possible, the probability of dropping a channel due to a beam roll off or transition is reduced.

Once either an inter-satellite or intra-satellite handoff decision has been made, rather than making further signal quality measurements, the beam number can be used to select the antenna pattern for use after handoff. An antenna pattern can be selected after handoff using the beam number or ring as discussed above with respect to FIGS. 4 and 6 and the TABLE.

Although the invention has been described and illustrated in the above description and drawings, it is understood that this description is by example only, and that numerous changes and modifications can be made by those skilled in the art without departing from the true spirit and scope of the invention. Although the above drawings depict an array of only two antenna elements, more than two antenna elements can be used for steering. Further, steering can be accomplished either by switching on one antenna element and switching off the other antenna elements or by combining various combinations of two or more antenna elements at different phases. The present invention is not limited to radiotelephones and pagers but can be applied to other devices such as ground stations, fixed satellite telephone booths, aircraft and marine stations. Further, the principles of the present invention, although applied by example to satellite systems, can additionally apply to cellular voice or radio data systems having ground based cell sites with multiple beams requiring directionality in different horizontal rather than vertical directions and still requiring steering and handoff both intra-site and inter-site.

What is claimed is:

1. An earth station transceiver for communicating with at least one satellite in orbit and wherein the satellite has multiple beams, said earth station transceiver comprising:

an antenna having an array of antenna elements for creating an antenna pattern;

a receiver operatively coupled to said antenna to receive data at least identifying one of the multiple beams; and steering circuitry operatively coupled to said antenna and said receiver for steering the antenna pattern by fixing the antenna pattern to an orientation having optimum signal quality upon communication with a satellite in response to the data identifying one of the multiple beams when the data identifying one of the multiple beams indicates that the satellite is outside a predetermined elevation angle range.

2. A transceiver according to claim 1, wherein said steering circuitry is operatively coupled to said antenna for steering in response to a signal quality measurement during a frame of interest when the data identifying one of the multiple beams indicates that the satelite is inside a predetermined elevation angle range.

3. A transceiver according to claim 1, wherein the satellite is in non-geosynchronus orbit.

4. A transceiver according to claim 1, further comprising a selectively enabled non-coherent detector operatively coupled to said antenna and said steering circuitry to selectively non-coherently detect a received signal dependent upon steering changes for said antenna issued by said steering circuitry for phase compensation during steering.

5. A subscriber transceiver for handoff among at least two downlink cell sites, said transceiver comprising:

an antenna having an array of antenna elements for creating an antenna pattern capable of communication with the downlink cell sites; and steering circuitry operatively coupled to said antenna for steering the antenna pattern to an orientation having optimum signal quality upon communication with one of the downlink cell sites at a position and, when determining whether to make an intra-site handoff, for fixing the antenna pattern by disabling the steering during intra-site handoff measurements and immediately after an intra-site handoff occurs.

6. A subscriber transceiver according to claim 5, wherein said steering circuitry comprises an inter-site handoff comparitor operatively coupled to said antenna for performing a subscriber transceiver assisted inter-site handoff when a signal quality received from a candidate downlink cell site at an orientation having optimum signal quality with the candidate downlink cell site is better than a signal quality from a current one of the downlink cell sites at a current orientation.

7. A subscriber transceiver according to claim 5, wherein the downlink cell sites are satellites having multiple beams;

wherein the position of one of the downlink cell sites is a beam position of one of the multiple beams represented by data identifying one of the multiple beams; and wherein said steering circuitry is operatively coupled to said antenna to steer said antenna based on the data identifying one of the multiple beams.

8. A subscriber transceiver according to claim 5, wherein at least one of the downlink cell sites is a satellite in non-geosynchronus orbit.

9. A method of communicating between an earth station transceiver and at least one satellite in orbit and wherein the satellite has multiple beams, said method comprising the steps of:

(a) creating an antenna pattern from an antenna having an array of antenna elements; and (b) steering the antenna pattern by fixing the antenna pattern to an orientation having optimum signal quality upon communication with a satellite in response to data identifying one of the multiple beams when the data identifying one of the multiple beams indicates that the satellite is outside a predetermined elevation angle range.

10. A method according to claim 9, wherein said step (b) steers the antenna pattern in response to a signal quality measurement during a frame of interest when the data identifying one of the multiple beams indicates that the satellite is inside a predetermined elevation angle range.

11. A method according to claim 9, further comprising the step of (c) phase compensating by selectively enabling non-coherent detection dependent upon steering changes for the antenna by said step (b).

12. A method of handoff of a subscriber terminal among at least two downlink cell sites, said method comprising the steps of:

(a) creating an antenna pattern from an antenna of the subscriber terminal having an array of antenna elements;

(b) steering the antenna pattern of the subscriber terminal to an orientation having optimum signal quality upon communication with one of the downlink cell sites at a position; and (c) when determining whether to make an intra-site handoff, fixing the antenna pattern by disabling the steering of said step (b) during intra-site handoff measurements.

13. A method according to claim 12, further comprising the step of (d) performing a subscriber transceiver assisted inter-site handoff when a signal quality received from a candidate downlink cell site at an orientation having optimum signal quality with the candidate downlink cell site is better than a signal quality from a current one of the downlink cell sites at a current orientation.

14. A method according to claim 13, wherein said step (d) comprises the substep of (d1) comparing the signal quality from the candidate downlink cell site and the signal quality from the current one of the downlink cell sites in the same time slot of a time division multiple access system.

15. A method according to claim 12, wherein the downlink cell sites are satellite having multiple beams;

wherein the position of one of the downlink cell sites is a beam position of one of the multiple beams represented by data identifying one of the multiple beams; and wherein said step (c) comprises the substep of (c1) steering said antenna based on the data identifying one of the multiple beams.

* * * * *